United States Patent Office 3,549,704
Patented Dec. 22, 1970

3,549,704
SALICYLAMIDES
Gerrit Jantinus Katerberg, Van Houtenlaan, Weesp, and Gerrit van Vliet, Baarn, Netherlands, assignors, by mesne assignments, to U.S. Philips Corporation, New York, N.Y., a corporation of Delaware
No Drawing. Filed May 13, 1968, Ser. No. 728,785
Claims priority, application Netherlands, May 19, 1967, 6706931; Feb. 19, 1968, 6802364
Int. Cl. C07c 103/30
U.S. Cl. 260—559                    3 Claims

ABSTRACT OF THE DISCLOSURE

The invention relates to new salicylamides having anthelmintic activity against flatworms.

From Japanese patent specification 18,827/64 it is known that 3,4′,5-tribromo-salicylanilide has an anti-lever fluke activity.

It has surprisingly been found that the new salicylamides of Formula I

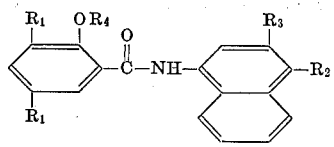

can much better be used for controlling liver fluke than the known agent. This is expressed in a considerably higher therapeutic index which is caused by a stronger activity and/or a lower toxicity. For the control of schistosomes also the therapeutic index is considerably higher. Moreover the compounds have a very strong activity against tape worms and also a strong anti-bacterial activity. In particular 3,5-dibromo-N-(4-chloronaphthyl-1)salicylamide and 3,5-dibromo-N-(3,4-dichloronaphthyl-1)salicylamide have a very strong activity.

In Formula I, $R_1$, $R_2$ and $R_3$ represent a chlorine atom, a bromine atom or a iodine atom while $R_2$ or $R_3$ may represent a hydrogen atom. $R_4$ is a hydrogen atom or an acyl group having 1 to 8 carbon atoms.

Economically it is of great importance to have the disposal of agents for controlling liver fluke. Already in Holland this organism causes an annual damage of 100 to 200 million guilders. The milk production of infected cows is 20 to 25% less, the milk being in addition of a lower quality. The slaughtered weight also and the value of the beef decrease. A liver fluke infection in sheep causes the wool production to be lowered both qualitatively and quantitatively.

The compounds according to the invention are of great value also due to their activity againts tapeworms and schistosomes. Mainly in warmer districts, 150 to 300 million people are estimated to suffer from schistosomiasis, sometimes termed bilharziasis. The agents commonly used so far for controlling schistosomes, for example, antimony compounds, do not give full satisfaction owing to toxic side effects and/or insufficient activity.

The anti-liver fluke activity of the compounds was found in a test on rabbits infected with liver fluke.

In order to obtain the infectious stage, the ova of liver fluke obtained from a slaughter house and stored in Melnick medium (Proc. Soc. Exp. Biol. Med. 81, 208 (1952) were collected and stored in distilled water for 11 days at 27° C., the miracidia were liberated from the ova by a light and cold stimulus.

In order to have the disposal of the intermediate host Lymna truncatula to be infected with said miracidia, an algae and snake culture was maintained.

Three-week-old snakes were infected with 5 miracidia. Approximately 7 weeks afterwards the cercaria were liberated by crushing the snake and bringing it in water in a cellophane sheath. The metacercaria deposited on the cellophane. The sheaths were stored at 4° C. in a moist atmosphere. By means of the Wickerhauser test (Am. J. Vet. Res. 21, 895 (1960)), the viabiilty of the metacercaria was determined before use.

Rabbits, approximately 6 weeks old, were infected with 80 viable metacercaria each, which were provided in a gelatin capsule. In order to have adult liver fluke for the test, the substance to be investigated was administered only after 9 weeks. After determining the maximum tolerable dose—that is the largest quantity which, when administered orally to four mice for two successive days, gives no clinical to phenomena 48 hours after the last administration—the substance was once administered to the rabbits through a rubber esophagus probe in the maximum tolerable dose. If this dose was above 250 mg./kg., the last-mentioned quantity was administered. Two days after the administration the rabbits were dissected. The liver fluke present in the bile ducts and bile bladder were collected in a warm physiological salt solution. The effect of the substance on the liver fluke was evaluated as is described by Lämmler (Arzneimittelforschung 5, 497–502 (1955)).

The results were as follows:

| $R_1$ | $R_2$ | $R_3$ | $R_4$ | Dose, mg./kg. | Activity, percent | Maximum tolerable dose, mg./kg. |
|---|---|---|---|---|---|---|
| Br | Br | H | H | 35 / 25 | 75 / 25 | 1,000 |
| Br | Cl | H | H | 25 / 15 | 76 / 99 | 750 |
| Br | H | Cl | H | 100 | 100 | 400 |
| Br | Cl | Cl | H | 15 / 10 | 100 / 51 | 50 |
| I | Cl | H | H | 35 | 100 | 300 |
| Cl | Cl | H | H | 50 | 100 | 400 |
| Br | Cl | H | $CH_3NHC=O$ | 250 | 100 | =1,000 |

The activity of the compounds against schistosomes was found in a test according to the principle by Pellegrino et al. (Am. J. Trop. Med. Hyg. 11, 201–215 (1962)). Female schistosoma mansoni begin to produce ova approximately 40 days after entering the host. The ova are laid unripe and the embryo therein needs approximately 6 days to ripen. By the addition of a schistosomicide the production of ova is interrupted by expelling worms to the liver, but ripening of the laid ova continues. After approximately 6 days all the unripe ova will have reached the ripe stage.

The various stages are divided in 1st, 2nd, 3rd, 4th and the ripe stage. The activity of a substance is determined 7 days after the beginning of the administration with reference to the number of ripe ova present in the intestinal wall. If a substance expels the worms to the liver already after the first administration, no ova are laid anymore in the intestinal wall from that instant on. Seven days later only ripe ova are found.

Young snakes (Australorbis glabratus) were infected with miracidia obtained from infected mice by causing them to stay overnight in a beaker glass containing 2 ml. of double distilled water in which 10 miracidia. After approximately 1 month the snakes were stimulated to produce cercaria by a sudden vivid illumination.

Mice were infected by administering 50–100 cercaria subcutaneously.

Since all the stages are present in the intestinal wall on the 47th day after the infection, the test was started on this day. For that purpose, a quantity of the substance to be investigated was orally administered to 7 mice for five days. On the 54th day after the infection the mice were dissected. Approximately 300 of the animals present in the wall of the small intestine were differentiated according to stage by compressing three pieces of intestine between two glasses and inspecting them under the microscope. In each piece 100 ova were counted. The percentage of ripe ova was compared with that in untreated infected mice.

The results were as follows:

| $R_1$ | $R_2$ | $R_3$ | $R_4$ | Dose mg./kg. | Percent ripe ova | Percent ripe ova in blanks |
|----|----|----|----|------|-----|----|
| Br | Br | H  | H  | 100  | 53  | 30 |
| Br | Cl | H  | H  | 25   | 90  | 36 |
| Br | H  | Cl | H  | 25   | 100 | 31 |
|    |    |    |    | 25   | 75  | 31 |
| Br | Cl | Cl | H  | 5    | 100 | 31 |
|    |    |    |    | 25   | 88  | 43 |
| I  | Cl | H  | H  | 25   | 82  | 31 |
|    |    |    |    | 15   | 98  | 31 |
| Cl | Cl | H  | H  | 50   | 79  | 42 |

The activity against tapeworms was found in experiments on mice. The animals were infected with 1500 ova of *Hymenolepis nana*. Thirteen days after the infection once a dose of the substance to be investigated was administered orally. There days later the mice were dissected and the number of worms present in the intestine was compared with the number of worms in untreated mice.

The results were as follows:

| $R_1$ | $R_2$ | $R_3$ | $R_4$ | Dose mg./kg. | Activity percent |
|----|----|---|---|-----|-----|
| Br | Br | H | H | 200 | 100 |
| Br | Cl | H | H | 200 | 100 |
| Cl | Cl | H | H | 400 | 100 |

The antibacterial activity of the compounds was found in experiments in which the substance to be investigated, after irradiation with U.V. light for 30 minutes for sterilization was suspended in a sterile 1% carboxymethylcellulose solution. The suspension was added to a warm agar solution which was then poured in Petri dishes. After cooling the agar plates, they were incubated with a liquid bacteria culture, for example, of *Micrococcus areus*. The plates were incubated at 37° C. for 24 hours, after which the bacteria growth was compared with a blank.

After the compounds according to the invention have been brought in a suitable of administration form, they may be used for controlling bacteria infections and infections with flatworms, for example, liver flukes, tapeworms and schistosomes.

For the treatment of patients with schistosomes infection 10–250 mg. of substance per kg. of bodyweight daily will generally be prescribed. This quantity should be administered from 5 to 15 days. As a rule 25–100 mg. per kg. daily will be administered. These doses may be administered, if required, in three portions.

For controlling tapeworms in man the dose is in general 0.5–2 g. daily for 1–3 days. A dose of 50 to 200 mg./kg. daily will generally be administered to animals, if required in portions. For the treatment of hens a quantity of 200 p.p.m. mixed with the animal feed is considered for administration for 2 to 3 weeks.

For the treatment of sheep, goats, cows, rabbits and similar animals against liverfluke infection 10–100 mg. of active substance per kg. of bodyweight will generally be administered. As a rule the dose will be between 20 and 50 mg./kg. This quantity will generally be administered in one dose.

The compounds may be processed to pharmaceutical and veterinary compositions according to conventional methods. The compounds may be mixed with or dissolved in the conventional solid or liquid carriers and in this manner pills, tablets, bougies, capsules, injection liquids, powders, suspensions and the like may be prepared.

For example, the substances may be mixed with an equal quantity of starch or lactose and pills may be prepared from the mixture. Tablets may be prepared, for example, from 100 mg. of active substance, 10 g. of maize starch, 10 g. of talcum, 5 g. of magnesium stearate and 145 g. of lactose or from 50 mg. of active substance, 10 g. of starch, 5 g. of calcium carbonate, 5 g. of calcium phosphate and 145 g. of lactose.

The substances may alternatively be mixed with the conventional feed or premixes.

The compounds of Formula I can be obtain according to methods known per se. The invention, therefore, also relates to a method of preparing new salicylamides, characterized in that compounds of formula I

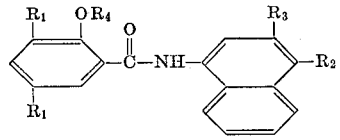

wherein $R_1$, $R_2$ and $R_3$ represent a chlorine atom, a bromine atom or a iodine atom, while $R_2$ or $R_3$ may represent a hydrogen atom, and $R_4$ is a hydrogen atom or an acyl group having 1 to 8 carbon atoms, are prepared according to methods which are known from the preparation of this type of compounds and according to methods analogous thereto.

The compounds may be prepared, for example, by reacting a salicylic acid derivative of Formula II

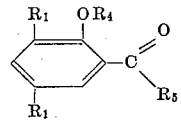

with an α-napthylamine of Formula III

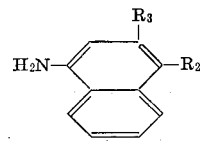

in which formulae the symbols have the same meanings as in Formula I and $R_5$ is a hydroxy group, a halogen atom, preferably a chlorine atom, or a phenoxy group. The reaction may be carried out in a suitable solvent, for example, aromates, halogenated aromates and acetonitrile. The boiling point of the solvent will usually be chosen as the reaction temperature. Lower temperatures, however, are considered. If an acid halogenide of Formula I is reacted, it is recommendable to add an acid binder to the reaction mixture. As such are to be considered tertiary amines, pyridine, picolines and the like.

The compounds of Formula I, where $R_3$ is a hydrogen atom, may alternatively be obtained by halogenating a compound of Formula IV IV 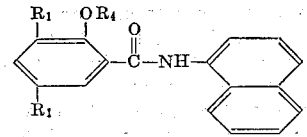

wherein the symbols have the same meanings as in Formula I. As solvents may be used in this reaction inter alia acetic acid, dioxane and halogenated hydrocarbons.

In order to prepare the para-chlorine compounds, said reaction may be carried out with chlorine or sulphuryl chloride ($SO_2Cl_2$).

In order that the invention may be readily carried into effect it will now be described in greater detail with reference to the ensuing specific examples.

EXAMPLE 1a 3,4-dichloro-1-amino-napthalene

One spatula-full of Raney nickel was added to solution of 3.7 g. (15 mmol) of 3,4-dichloro-1-nitronapthalene in 125 ml. of benzene followed by hydrogenation at normal temperature and pressure until the calculated quantity of hydrogen was taken up. The catalyst was filtered off, the filtrate evaporated to dryness and the residue crystallized from petroleum ether 60–80°. Yield: 2.6 g. of crystalline product with melting point 127–129° C.

EXAMPLE 1b

N-(3,4-dichloro-napthyl-1)-3,5-dibromosalicylamide

A solution of 0.065 mol of 3,5-dibromosalicyloylchloride in 125 ml. of acetonitrile was added, while stirring, to a solution of 0.060 mol of 1-amino-3,4-dichloronapthalene in 300 ml. of acetonitrile. After stirring for six hours and refluxing, another 200 ml. of acetonitrile were added. The reaction mixture was filtered while hot and a substance crystallised from the filtrate upon cooling which was recrystallised from dichloroethane. Melting point 237.5–239° C.

EXAMPLE 2

N-(4-chloronaphthyl-1)-3,5-diiodosalicylamide

This substance was obtained in a similar manner from 4-chloro-4-amino-naphthalene and 3,5 - diiodosalicyloylchloride in dry benzene. Melting point after recrystallisation from dichloro-ethane 221–224° C.

EXAMPLE 3

N-(3-chloronaphthyl-1)-3,5-dibromosalicylamide

This substance was obtained in a similar manner from 3-chloro-1-amino-naphthalene and 3,5-dibromosalicyloylchloride in dry benzene. Melting point after recrystallisation from dichloro-ethane 209–212° C.

EXAMPLE 4

N-(4-chloro-naphthyl-1)-3,5-dibromosalicylamide

A mixture of 12.73 g. (0.043 mol) of 3,5-dibromosalicylic acid, 7.63 g. (0.043 mol) of 1-amino - 4 - chloronaphthalene, 5.93 g. (0.043 mol) of $PCl_3$, a small crystal of $AlCl_3$ and 150 mol of chlorobenzene were heated under reflux 210 minutes. This reaction mixture was filtered while hot and, after cooling, diluted with 200 ml. of $CH_2Cl_2$. The resulting solution was shaken two times with 150 ml. of water and dried on $Na_2SO_4$. After filtering the $CH_2Cl_2$ and chlorobenzene were evaporated in vacuo and the still liquid residue was dissolved in 100 ml. of hot ethyl alcohol. From this solution, upon cooling, crystallised 10.9 g. of a light-brown crystalline substance of melting point 202–204° C. This was crystallised again from 500 ml. of ethyl alcohol resulting in 9.3 g. of crystalline substance of melting point 204–206° C.

The mother liquors, after column chromatography, for example, yielded another 2.0 g. of melting point 204–206° C.

EXAMPLE 5

N-(4-chloro-naphthyl-1)-3,5-dibromosalicylamide

A solution of 20.4 g. (0.065 mol) of 3,5-dibromosalicylchloride in 125 ml. of dry benzene was added, while stirring, to a solution of 10.7 g. (0.060 mol) of 1-amino-4-chloro-naphthalene in 300 ml. of dry benzene. After stirring and refluxing for 6 hours another 200 ml. of dry benzene were added. The reaction mixture was filtered while hot and upon cooling the filtrate 14.0 g. of product crystallised of melting point 199–204° C. The filtered substance was crystallised from 350 ml. of benzene from which 6.8 g. of product of melting point 206–207° C. were obtained.

Another 2 crystalline fractions of lower melting point were obtained from the combined mother liquors by concentration. These fractions were purified, together with the evaporated mother liquor, by means of column chromatography: 2.65 g., melting point 205–207° C.

The first crystallisation fraction of 14.0 g. was also purified via column chromatography. Yield: 11.2 g. of melting point 204–206° C.

EXAMPLE 6

N-(4-bromo-naphthyl-1)-3,5-dibromosalicylamide

This substance was prepared in a manner similar to that of Example 4. After recrystallisation from ethyl alcohol/acetone 1:1 a melting point of 219–221° C. was measured.

EXAMPLE 7

N-(4-chloro-naphthyl-1)-3,5-dibromosalicylamide 50.5 g. (0.12 mol) of N-(1-naphthyl)-3,5-dibromosalicylamide were dissolved in 2 litres of dry methylene chloride. A solution of 17.6 g. (0.13 mol) of sulphuryl chloride in 500 ml. of dry methylene chloride was added dropwise to this solution while cooling with ice and stirring within one hour. After leaving to stand at room temperature for 390 minutes, 1 litre of methylene chloride was distilled off at normal pressure in approximately 60 minutes. After leaving to stand overnight in the refrigerator the crystalline substance was sucked off. After washing with cold methylene chloride and drying 30.0 g. of product were obtained having a melting point of 203–205° C.

EXAMPLE 8

O-(N-methylcarbonate) of N-(4-chloro-naphthyl-1)-3,5-dibromosalicylamide

A solution of 1.60 g. (28 mmol) methylisocyanate in 5 ml. of toluene was added dropwise to a warm (35° C.) solution of 9.12 g. (20 mmol) N-(4-chloro-naphthyl-1)-3,5-dibromosalicylamide in 30 ml. of dry tetrahydrofuran to which were added 3 drops of triethylamine. A few minutes later a solid precipitated. After having stand for 16.5 hours at room temperature the reaction mixture was diluted with 100 ml. of ether, the precipitate was filtered with suction and dried.

The product was crystallized by dissolving in 100 ml. warm (100° C.) dimethylformamide and diluting with 140 ml. of ethanol. After washing with ethanol and drying a product was obtained, melting above 180° C. (dec.).

What is claimed is:

1. A compound of the formula

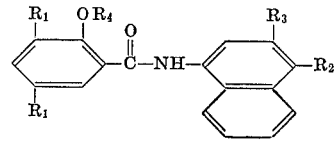

wherein $R_1$ is a member selected from the group consisting of chlorine, bromine and iodine, $R_2$ and $R_3$ are each members selected from the group consisting of hydrogen, chlorine, bromine and iodine with the proviso that only one of $R_2$ and $R_3$ is hydrogen and $R_4$ is selected from the group consisting of hydrogen and methylaminocarbonyl.

2. The compound of claim 1, N-(3,4-dichloronaphthyl-1)-3,5-dibromosalicylamide.

3. The compound of claim 1, N-(4-chloronaphthyl-1)-3,5-dibromosalicylamide.

References Cited

Weffen et al., Die Pharmazie, vol. 21, pp. 477–82 (1966).

HENRY R. JILES, Primary Examiner

H. I. MOATZ, Assistant Examiner

U.S. Cl. X.R.

260—479; 424—324